United States Patent
Meyst et al.

(10) Patent No.: US 10,316,754 B2
(45) Date of Patent: Jun. 11, 2019

(54) GAS TURBINE ENGINE HEAT EXCHANGER MANIFOLD

(71) Applicant: UNITED TECHNOLOGIES CORPORATION, Hartford, CT (US)

(72) Inventors: William Meyst, Middletown, CT (US); Andre Herman Troughton, Windsor Locks, CT (US); Brian J. Breslin, Palm Beach Gardens, FL (US); Jesse Ian Berube, Simsbury, CT (US); Christopher Durkee, Westfield, MA (US); David A. Welch, Quaker Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 882 days.

(21) Appl. No.: 14/771,294

(22) PCT Filed: Mar. 12, 2014

(86) PCT No.: PCT/US2014/023952
§ 371 (c)(1),
(2) Date: Aug. 28, 2015

(87) PCT Pub. No.: WO2014/159505
PCT Pub. Date: Oct. 2, 2014

(65) Prior Publication Data
US 2016/0131039 A1 May 12, 2016

Related U.S. Application Data

(60) Provisional application No. 61/782,425, filed on Mar. 14, 2013.

(51) Int. Cl.
*F02C 7/14* (2006.01)
*F28F 9/02* (2006.01)
(Continued)

(52) U.S. Cl.
CPC ............. *F02C 7/185* (2013.01); *F02C 7/14* (2013.01); *F02C 7/28* (2013.01); *F28F 9/02* (2013.01);
(Continued)

(58) Field of Classification Search
CPC .... F02C 7/14; F02C 7/185; F02C 7/28; F05D 2240/55; F05D 2240/91; F05D 2240/314;
(Continued)

(56) References Cited

U.S. PATENT DOCUMENTS 2,601,973 A * 7/1952 Jensen .................. F28D 9/0018
165/151
3,756,020 A 9/1973 Moskowitz et al.
(Continued)

FOREIGN PATENT DOCUMENTS

DE 2747846 5/1978
EP 2541180 1/2013

OTHER PUBLICATIONS

International Search Report and Written Opinion of the International Searching Authority for International application No. PCT/US2014/023952 dated Jun. 25, 2014.
(Continued)

*Primary Examiner* — Audrey K Bradley
*Assistant Examiner* — Dapinder Singh
(74) *Attorney, Agent, or Firm* — Carlson, Gaskey & Olds, P.C.

(57) ABSTRACT

A heat exchanger manifold for a gas turbine engine according to an exemplary aspect of the present disclosure includes, among other things, a manifold body extending between a first face and a second face, a first seal land defining a first fluid port extending through the manifold body between the first face and the second face, and a first seal received within the first fluid port.

21 Claims, 5 Drawing Sheets

(51) Int. Cl.
*F02C 7/28* (2006.01)
*F02C 7/18* (2006.01)

(52) U.S. Cl.
CPC ...... *F05D 2240/55* (2013.01); *F05D 2240/91* (2013.01); *F05D 2250/314* (2013.01); *F05D 2260/213* (2013.01); *F05D 2260/60* (2013.01); *F28F 2009/029* (2013.01)

(58) Field of Classification Search
CPC ............ F05D 2260/213; F05D 2260/60; F28F 2009/029
USPC ......................................................... 415/175
See application file for complete search history.

(56) References Cited

U.S. PATENT DOCUMENTS

| | | | |
|---|---|---|---|
| 3,799,823 A * | 3/1974 | Talty | A22C 13/0006 156/86 |
| 4,251,185 A | 2/1981 | Karstensen | |
| 4,542,623 A | 9/1985 | Hovan et al. | |
| 5,243,815 A | 9/1993 | Maier et al. | |
| 5,317,877 A | 6/1994 | Stuart | |
| 5,458,343 A | 10/1995 | Dornfeld et al. | |
| 6,367,240 B1 | 4/2002 | Hoyer et al. | |
| 7,017,656 B2 | 3/2006 | Beddome et al. | |
| 7,334,411 B2 | 2/2008 | Vandermolen | |
| 7,784,528 B2 | 8/2010 | Ottow et al. | |
| 8,171,738 B2 | 5/2012 | Fish et al. | |
| 8,231,142 B2 | 7/2012 | Olver | |
| 2008/0156473 A1 | 7/2008 | Ottow et al. | |
| 2010/0043386 A1 | 2/2010 | Perveiler et al. | |
| 2011/0146944 A1 | 6/2011 | Hand et al. | |
| 2012/0167860 A1 * | 7/2012 | Wong | F02B 29/0462 123/542 |
| 2015/0369354 A1 * | 12/2015 | Chudy | F16H 57/0483 165/41 |

OTHER PUBLICATIONS

The Extended European Search Report for EP Application No. 14773004.8, dated Oct. 21, 2016.

* cited by examiner

GAS TURBINE ENGINE HEAT EXCHANGER MANIFOLD

BACKGROUND

This disclosure relates generally to a gas turbine engine, and more particularly to a gas turbine engine heat exchanger manifold.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine loads.

Gas turbine engines typically channel airflow through the core engine components along a primary gas path. Portions of the gas turbine engine can be conditioned (i.e. heated or cooled) to ensure reliable performance and durability. For example, some parts of the compressor section and the turbine section, such as rotor assemblies that carry rotating blades, may require conditioning during engine operation to cool such components.

A buffer cooling system can be employed within the gas turbine engine to manage the heat generated by the gas turbine engine. The buffer cooling system may incorporate one or more heat exchangers that prepare and communicate pressurized cooling air to portions of the engine that require conditioning. Airflow can be bled from lower temperature areas of the gas turbine engine, such as the compressor section, and is fed to the heat exchangers, which condition the airflow to an acceptable temperature and pressure for communication to those portions of the gas turbine engine that require conditioning.

The heat exchangers are typically mounted to an outer casing of the gas turbine engine. Mounting locations for the heat exchangers may be limited by packaging, sealing and fireproof requirements of the gas turbine engine.

SUMMARY

A heat exchanger manifold for a gas turbine engine according to an exemplary aspect of the present disclosure includes, among other things, a manifold body extending between a first face and a second face, a first seal land defining a first fluid port extending through the manifold body between the first face and the second face, and a first seal received within the first fluid port.

In a further non-limiting embodiment of the foregoing heat exchanger manifold, the first face is attached to a flange of the gas turbine engine and the second face defines an angled interface relative to a heat exchanger.

In a further non-limiting embodiment of either of the foregoing heat exchanger manifolds, the heat exchanger is an air-to-air heat exchanger.

In a further non-limiting embodiment of any of the foregoing heat exchanger manifolds, the first seal land protrudes from at least one of the first face and the second face.

In a further non-limiting embodiment of any of the foregoing heat exchanger manifolds, the first seal land includes a forward face that protrudes from the first face and an aft face that protrudes from the second face.

In a further non-limiting embodiment of any of the foregoing heat exchanger manifolds, the forward face is angled and the aft face is linear.

In a further non-limiting embodiment of any of the foregoing heat exchanger manifolds, the forward face is angled in a direction that extends from the first face toward the second face.

In a further non-limiting embodiment of any of the foregoing heat exchanger manifolds, an inlet of the first fluid port is adjacent to one of the forward face and the aft face and an outlet of the first fluid port is adjacent to the other of the forward face and the aft face.

In a further non-limiting embodiment of any of the foregoing heat exchanger manifolds, the first seal is received at the inlet and a second seal is received at the outlet.

In a further non-limiting embodiment of any of the foregoing heat exchanger manifolds, the first seal is received within an inlet of the first fluid port and comprising a second seal received within an outlet of the first fluid port.

In a further non-limiting embodiment of any of the foregoing heat exchanger manifolds, a second fluid port through the manifold body includes a second seal therein.

In a further non-limiting embodiment of any of the foregoing heat exchanger manifolds, a third fluid port through the manifold body includes a second seal therein.

In a further non-limiting embodiment of any of the foregoing heat exchanger manifolds, the manifold body is a monolithic structure made of stainless steel.

In a further non-limiting embodiment of any of the foregoing heat exchanger manifolds, the first seal is a c-seal.

A gas turbine engine according to an exemplary aspect of the present disclosure includes, among other things, an engine casing and a heat exchanger mounted to the engine casing. A flange circumferentially extends about at least a portion of the engine casing at a position adjacent to the heat exchanger. A manifold is between the heat exchanger and the flange, the manifold connected to the flange and configured to provide an angled interface relative to the heat exchanger.

In a further non-limiting embodiment of the foregoing gas turbine engine, the heat exchanger is axially forward of the flange.

In a further non-limiting embodiment of either of the foregoing gas turbine engines, a forward portion of the heat exchanger is mounted to the engine casing and a rear portion of the heat exchanger interfaces with the manifold.

In a further non-limiting embodiment of any of the foregoing gas turbine engines, the flange is an annularly extending firewall.

In a further non-limiting embodiment of any of the foregoing gas turbine engines, the manifold includes a manifold body extending between a first face and a second face, a first seal land defining a first fluid port extending through the manifold body between the first face and the second face, and a first seal received within the first fluid port.

In a further non-limiting embodiment of any of the foregoing gas turbine engines, a second seal is received within the first fluid port.

The various features and advantages of this disclosure will become apparent to those skilled in the art from the following detailed description. The drawings that accompany the detailed description can be briefly described as follows.

DETAILED DESCRIPTION

Figure 1:
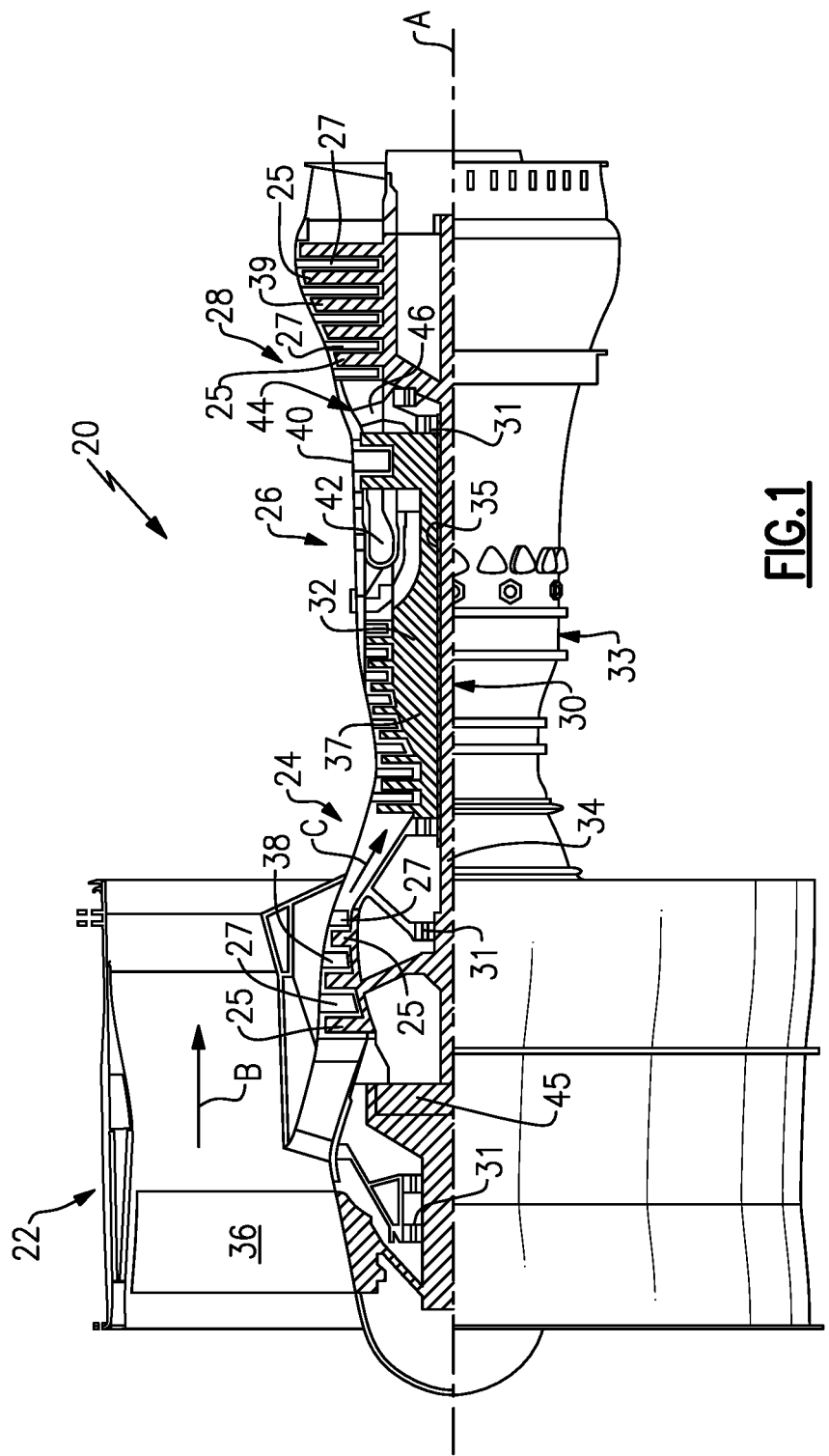
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°\ R)]0.5$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require dedicated cooling techniques to cool the parts during engine operation.

A buffer cooling system that incorporates one or more heat exchangers can be implemented into the gas turbine engine to prepare and communicate pressurized cooling air to portions of the engine that require conditioning. Among other features, this disclosure relates to a gas turbine engine heat exchanger manifold that can be incorporated into such a buffer cooling system. The exemplary heat exchanger manifold described herein effectively mounts, seals and packages a heat exchanger relative to an engine casing of a gas turbine engine and provides flexibility during installation and removal of the heat exchanger.

Figure 2A:
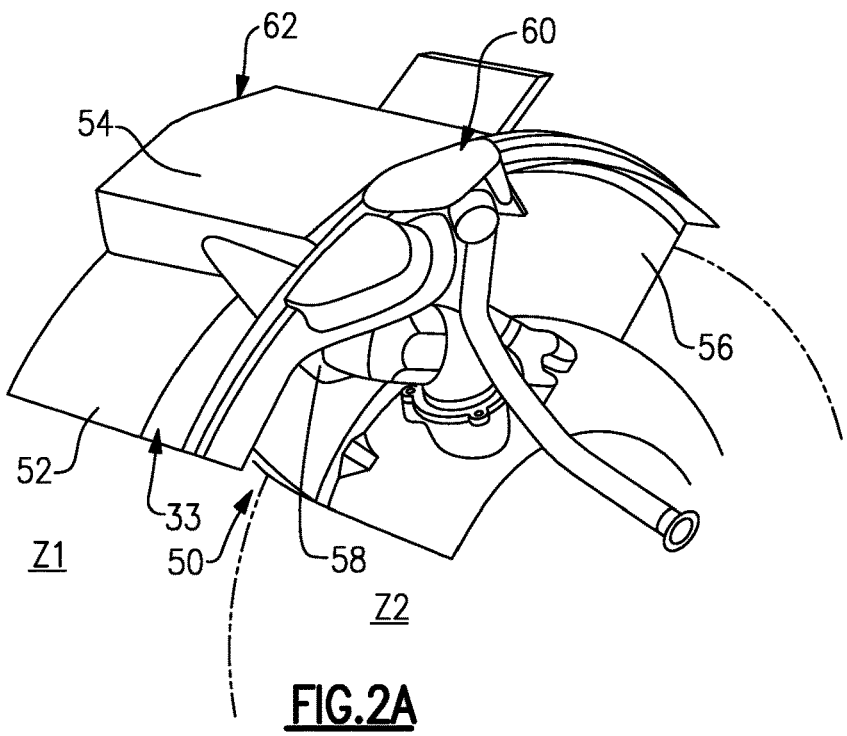
FIGS. 2A and 2B illustrate a portion of a gas turbine engine having an installed heat exchanger manifold.
Figure 2B:
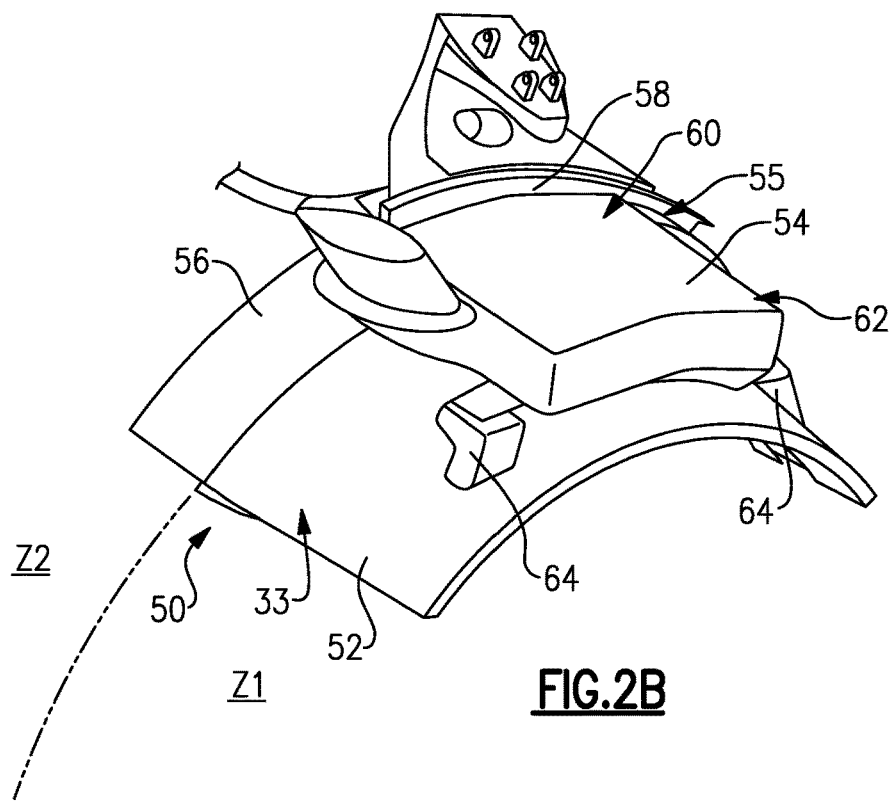

FIG. 2A (a rear view) and FIG. 2B (a forward view) illustrate a portion 50 of an engine static structure 33 of a gas turbine engine, such as the gas turbine engine 20. In this embodiment, the portion 50 includes an engine casing 52. The engine casing 52 may annularly extend between the low pressure compressor 38 and the high pressure compressor 37 of the gas turbine engine 20 (see FIG. 1). In another embodiment, the engine casing 52 is an intermediate casing of the engine static structure 33. In yet another embodiment, the engine casing 52 is located near the combustor section 26 of the gas turbine engine (see FIG. 1). It will be appreciated that the portion 50 could be located anywhere along the gas turbine engine 20.

A heat exchanger 54 is mounted to the engine casing 52. The heat exchanger 54 may be part of a buffer cooling system of the gas turbine engine 20 that communicates buffer cooling air to various portions of the gas turbine engine for pressurization and cooling purposes. In one embodiment, the heat exchanger 54 is an air-to-air heat exchanger. However, the heat exchanger 54 could alternatively a fuel-to-air heat exchanger, an oil-to-air heat exchanger, or any other suitable heat exchanger. Additional heat exchangers (not shown) may additionally be mounted to the engine casing 52.

A flange 56 may circumferentially extend about the engine casing 52 at a position adjacent to the heat exchanger 54. In this embodiment, the heat exchanger 54 is axially forward (i.e., upstream) of the flange 56. However, other positioning configurations are also contemplated.

In one embodiment, the flange 56 is an annularly extending firewall that radially extends about the engine casing 52. The firewall may include a radial wall (not shown) that is suitably joined within the core compartment of the gas turbine engine 20 to define a forward, relatively cool zone Z1 (e.g., a fire zone) and a rear, relatively hot zone Z2 (e.g., an ignition zone). The flange 56 could alternatively be a structure that is not a firewall.

A manifold 58 (best viewed in FIG. 2B) can be positioned between the heat exchanger 54 and the flange 56. In one embodiment, the manifold 58 is mechanically attached to the flange 56. For example, the manifold 58 may be bolted to the flange 56 to seal the flange 56. Of course, other mechanical attachment methodologies are also contemplated.

The manifold 58 may also be configured to provide an angled interface 55 relative to the heat exchanger 54. The angled interface 55 is discussed in greater detail below with reference to FIGS. 3A-3D. In this embodiment, a rear portion 60 of the heat exchanger 54 interfaces with the manifold 58, and a front portion 62 of the heat exchanger 54 is mounted to the engine casing 52 via one or more mounting brackets 64 (see FIG. 2B).

Figure 3A:
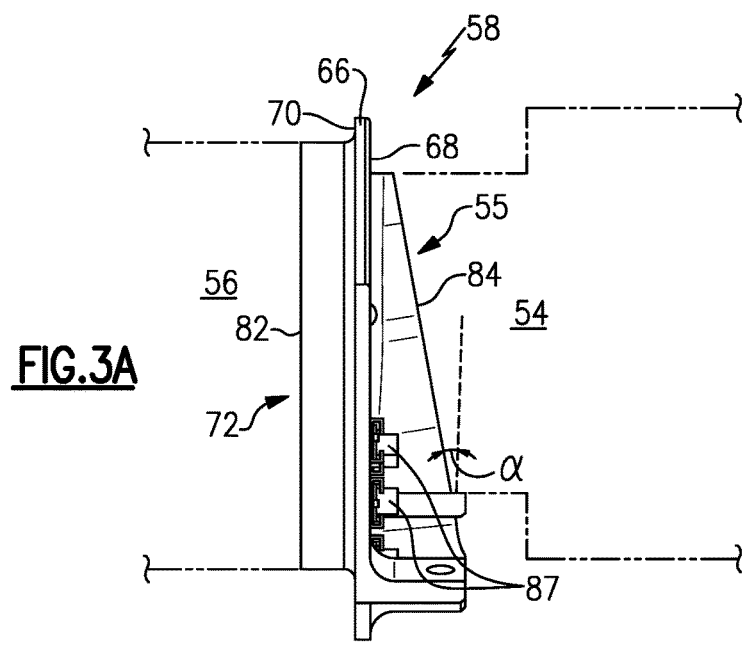
FIG. 3A illustrates a side view of a heat exchanger manifold.
Figure 3B:
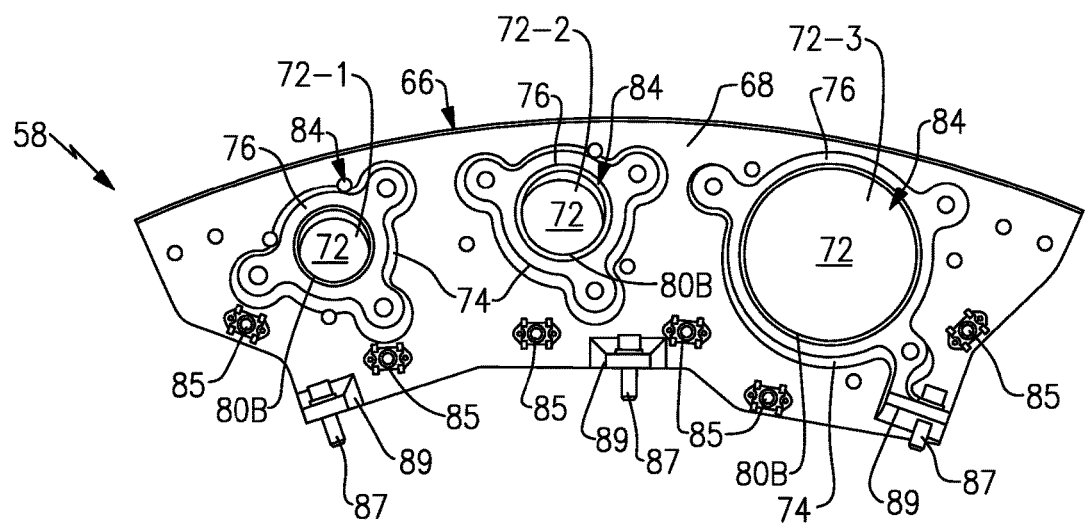
FIG. 3B illustrates a front view of a heat exchanger manifold.
Figure 3C:
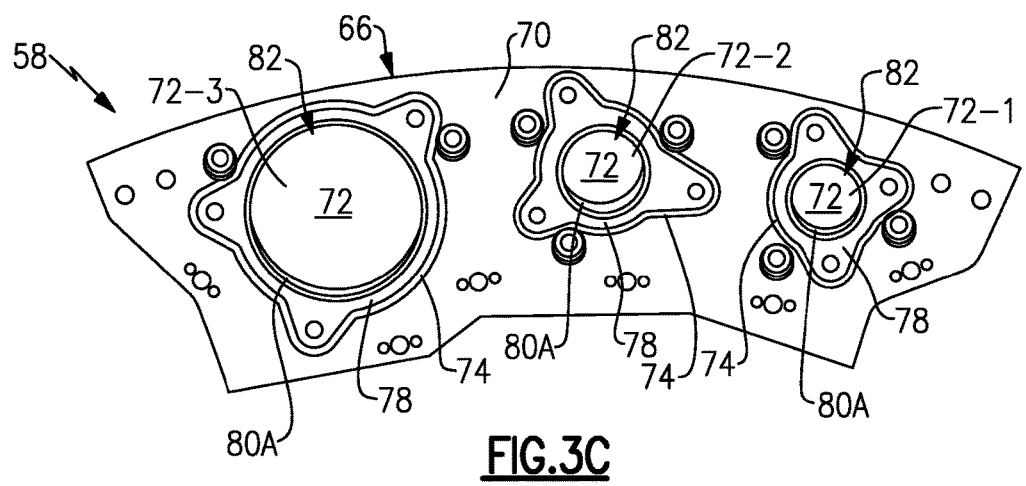
FIG. 3C illustrates a rear view of a heat exchanger manifold.
Figure 3D:
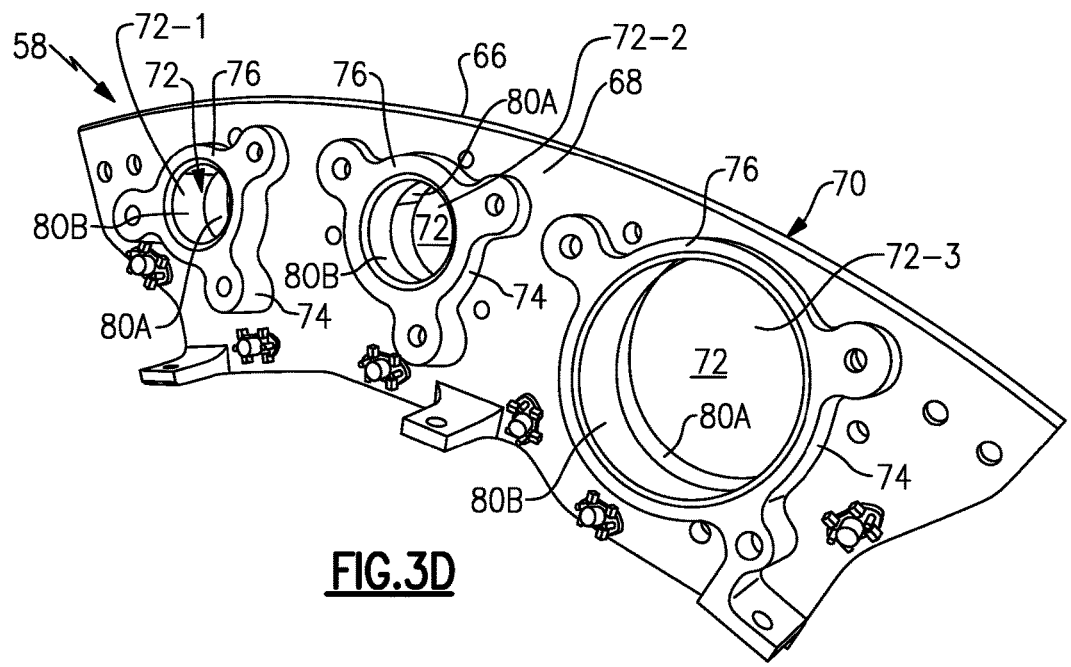
FIG. 3D illustrates an isometric view of a heat exchanger manifold.

FIGS. 3A, 3B, 3C and 3D illustrate one exemplary manifold 58 that can be incorporated to seal the flange 56 (shown schematically in FIG. 3A)) and provide the angled interface 55 relative to the heat exchanger 54 (shown schematically in FIG. 3A). The manifold 58 includes a manifold body 66 that extends between a first face 68 and a second face 70. In this embodiment, the first face 68 faces forward (i.e., in the upstream direction) and the second face 70 faces aft (i.e., in the downstream direction).

In one embodiment, the manifold body 66 is a monolithic structure made of stainless steel. However, other materials are also contemplated, including but not limited to titanium, aluminum and plastic. The material used to construct the manifold body 66 may depend on environmental temperatures the manifold 58 is exposed to, among other design and operating criteria. The manifold body 66 may be machined to construct the monolithic structure.

The manifold 58 additionally includes one or more fluid ports 72 that extend through the manifold body 66 between the first face 68 and the second face 70. In this embodiment, the manifold 58 includes first, second and third fluid ports 72 (indicated at 72-1, 72-2 and 72-3, respectively, in Figures 3B-3D). However, fewer or additional fluid ports 72 may extend through the manifold body 66. The size and shape of the fluid ports 72 can be similar or dissimilar. The number, size and shape of the fluid ports 72 incorporated into the manifold 58 may depend on certain design criteria, including but not limited to the components the manifold 58 interfaces with.

Each fluid port 72 is defined by a seal land 74 that circumferentially establishes an outer periphery of each fluid port 72. Each seal end 74 includes a forward face 76 that protrudes from the first face 68 and an aft face 78 that protrudes from the second face 70 of the manifold body. In one embodiment, the forward face 76 is angled relative to the first face 68 and the aft face 78 is generally linear (i.e., parallel to the second face 70). The forward face 76 may be angled in a direction that extends from the first face 68 toward the second face 70. Put another way, the forward face 76 may be swept in the aft direction (toward the flange 56) at an angle a (see FIG. 3A) to establish the angled interface 55. In another embodiment, the forward faces 76 of the seal lands 74 include smaller thicknesses at their radially outer portions. The angled interface 55 may extend at any angle and could include other configurations depending on the size of the heat exchanger 54 and other surrounding hardware. The angled interface 55 allows the heat exchanger 54 to be rotated away from the manifold 58 for simplified removal and installation of the heat exchanger 54 relative to the gas turbine engine 20.

One or more seals 80 may be received within each fluid port 72 of the manifold 58. In one embodiment, a first seal 80A is received within an inlet 82 of each fluid port 72 and a second seal 80B received within an outlet 84 of each fluid port 72. In other words, in one embodiment, two seals 80 may be received within each fluid port 72. In the illustrated embodiment, the inlet 82 is located at the aft face 78 and the outlet 84 is located at the forward face 76. Of course, an opposite configuration is also contemplated.

In one embodiment, the seals 80 are C-seals. Other seals may also be suitable. The seals 80 are annular rings that define fluid passageways for the communication of a fluid, such as pressurized and/or conditioned airflows, through the fluid ports 72.

One or more nut plates 85 (see FIGS. 3A and 3B) may be disposed through the manifold body 66. The nut plates 85 aid in attaching the manifold 58 to the flange 56. Fasteners 87 may also be provided for attaching the manifold 58 to the engine casing 52 (see FIG. 3B). The fasteners 87 extend through platforms 89 that protrude from the manifold body 66.

Figure 4A:
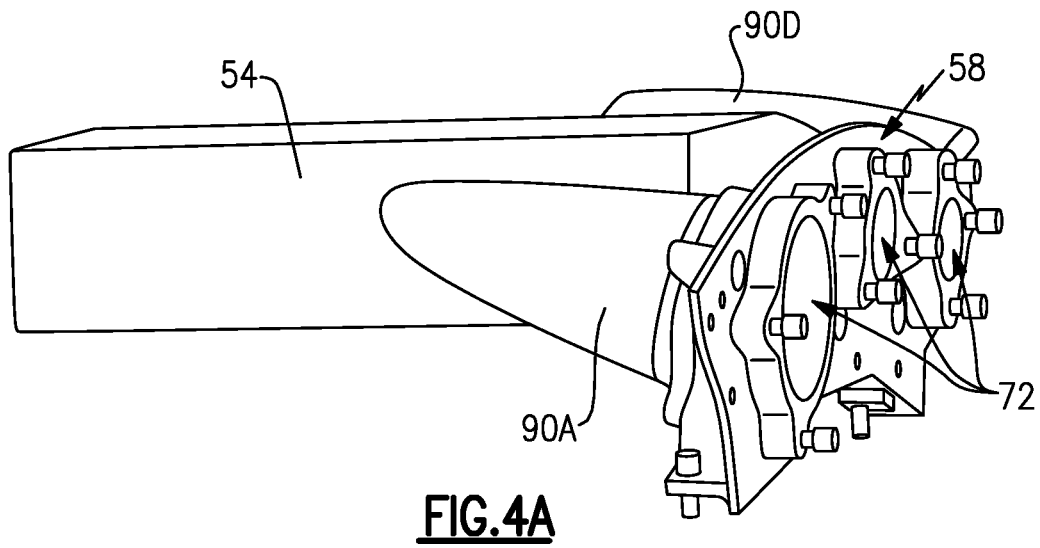
FIG. 4A illustrates a configuration of a heat exchanger manifold relative to a heat exchanger of a gas turbine engine buffer system.
Figure 4B:
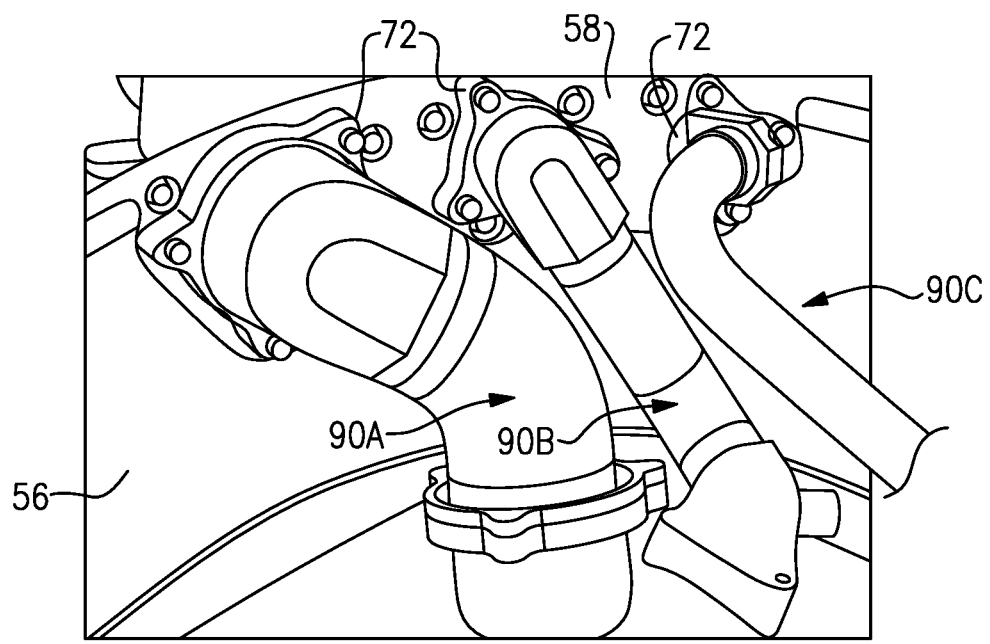
FIG. 4B illustrates a configuration of a heat exchanger manifold relative to a firewall of a gas turbine engine.

FIGS. 4A and 4B illustrate an exemplary configuration of a heat exchanger manifold 58 relative to a heat exchanger 54 (FIG. 4A) and a flange 56 (FIG. 4B). In one embodiment, the configuration includes multiple conduits 90 that may connect to the fluid ports 72 of the manifold 58. The conduits 90 define fluid passageways for communicating a fluid, such as pressurized or conditioned airflow, into and out of the heat exchanger 54 and through the flange 56. In this embodiment, the manifold includes the following conduits 90: a hot side inlet 90A, a hot side outlet 90B, a cold side inlet 90C and a cold side outlet 90D. The conduits 90 may extend from the engine casing 52 to the fluid ports 72 of the manifold 58 for communicating pressurized airflow through the flange 56 to the heat exchanger 54, and possibly from the heat exchanger 54 back through the flange 56. Other arrangements are also contemplated and may vary based on buffer cooling requirements and mounting locations of the heat exchanger 54.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A heat exchanger manifold for a gas turbine engine, comprising:
   a manifold body extending between a first face and a second face;
   a first seal land defining a first fluid port extending through said manifold body between said first face and said second face;
   a first seal received within said first fluid port; and
   wherein said first face is attached to a flange of the gas turbine engine, and said second face defines an angled interface relative to a heat exchanger such that the heat exchanger is mounted to said angled interface at a location external to said manifold body.

2. The heat exchanger manifold as recited in claim 1, wherein said heat exchanger is an air-to-air heat exchanger.

3. The heat exchanger manifold as recited in claim 1, wherein said first seal land protrudes outwardly from at least one of said first face and said second face.

4. The heat exchanger manifold as recited in claim 1, wherein said first seal is received within an inlet of said first fluid port and comprising a second seal received within an outlet of said first fluid port.

5. The heat exchanger manifold as recited in claim 1, wherein said manifold body is a monolithic structure made of stainless steel.

6. The heat exchanger manifold as recited in claim 1, wherein said first seal is a c-seal.

7. The heat exchanger manifold as recited in claim 1, comprising a second fluid port through said manifold body that includes a second seal therein.

8. The heat exchanger manifold as recited in claim 7, comprising a third fluid port through said manifold body that includes a third seal therein.

9. The heat exchanger manifold as recited in claim 1, wherein said first seal land includes a forward face that protrudes outwardly from said first face and an aft face that protrudes outwardly from said second face.

10. The heat exchanger manifold as recited in claim 9, wherein said forward face is angled relative to said first face, and said aft face is linear relative to said second face.

11. The heat exchanger manifold as recited in claim 9, wherein said forward face is angled in a direction that extends from said first face toward said second face.

12. The heat exchanger manifold as recited in claim 9, wherein an inlet of said first fluid port is adjacent to one of said forward face and said aft face and an outlet of said first fluid port is adjacent to the other of said forward face and said aft face.

13. The heat exchanger manifold as recited in claim 12, wherein said first seal is received at said inlet and a second seal is received at said outlet.

14. A gas turbine engine, comprising:
   a fan section including a fan;
   a compressor section including a compressor extending along an engine longitudinal axis;
   a turbine section including a turbine, the turbine extending along the engine longitudinal axis and driving the fan;
   an engine casing extending about the longitudinal axis;
   a heat exchanger mounted to said engine casing;
   a flange circumferentially extending about at least a portion of said engine casing at a position adjacent to said heat exchanger; and
   a manifold between said heat exchanger and said flange, said manifold connected to said flange and configured to provide an angled interface relative to said heat exchanger, and said heat exchanger mounted to said angled interface at a location external to the manifold.

15. The gas turbine engine as recited in claim 14, wherein said heat exchanger is axially forward of said flange.

16. The gas turbine engine as recited in claim 14, wherein a forward portion of said heat exchanger is mounted to said engine casing and a rear portion of said heat exchanger interfaces with said manifold.

17. The gas turbine engine as recited in claim 14, wherein said flange is an annularly extending firewall.

18. The gas turbine engine as recited in claim 14, wherein said manifold includes:
   a manifold body extending between a first face and a second face;
   a first seal land defining a first fluid port extending through said manifold body between said first face and said second face; and
   a first seal received within said first fluid port.

19. The gas turbine engine as recited in claim 18, comprising a second seal received within said first fluid port.

20. The gas turbine engine as recited in claim 18, wherein said flange is an annularly extending firewall including a radially extending wall that extends radially outward from said engine casing with respect to said engine longitudinal axis to define a cool zone and a hot zone, and said cool zone axially forward of said radially extending wall with respect to said engine longitudinal axis and said hot zone axially aft of said radially extending wall with respect to said engine longitudinal axis such that said hot zone is opposed to said cool zone.

21. The gas turbine engine as recited in claim 20, wherein said manifold body is a monolithic structure, a forward portion of said heat exchanger is mounted to said engine casing at a location spaced apart from said manifold, and a rear portion of said heat exchanger interfaces with said manifold at said angled interface.

* * * * *